May 8, 1928.  
C. E. VAWTER  
IMPEDANCE METER  
Filed Aug. 5, 1921
1,669,400
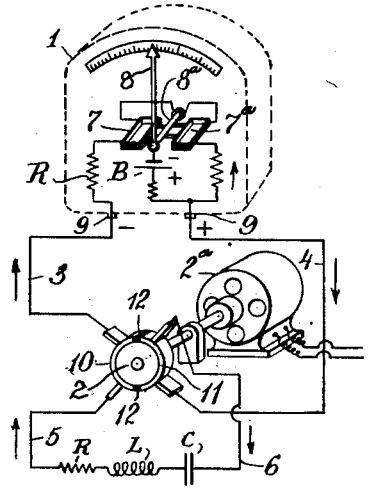
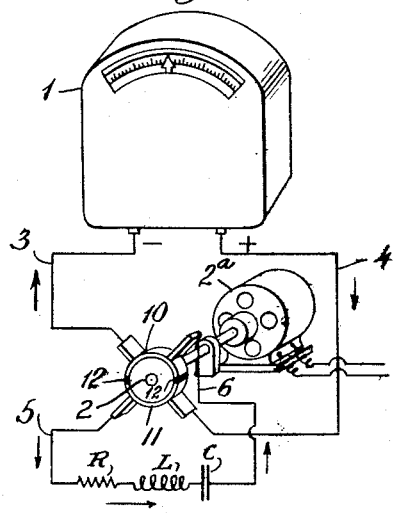
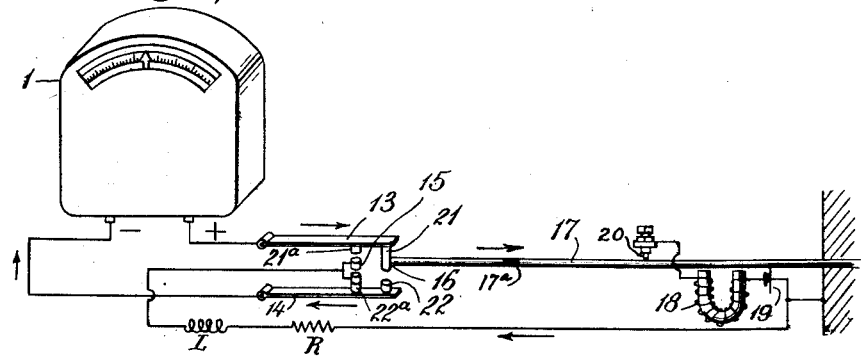
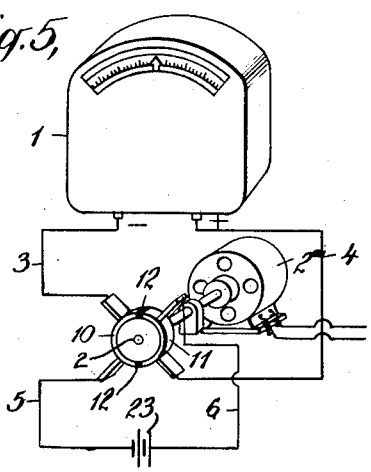
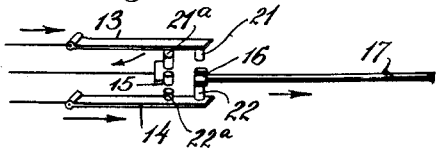
INVENTOR  
Charles E. Vawter  
BY  
Pennie, Davis, Marvin & Edmonds  
ATTORNEYS Patented May 8, 1928.

1,669,400

UNITED STATES PATENT OFFICE.

CHARLES E. VAWTER, OF PHILADELPHIA, PENNSYLVANIA, ASSIGNOR TO WESTON ELECTRICAL INSTRUMENT CORPORATION, OF NEWARK, NEW JERSEY, A CORPORATION OF NEW JERSEY.

IMPEDANCE METER.

Application filed August 5, 1921. Serial No. 490,102.

The present invention relates to the measurement of various quantities, chiefly of an electrical nature, and has to do particularly with an apparatus for measuring the impedance of an alternating current circuit.

An electrical circuit has certain inherent properties, commonly known as constants of the circuit, which determine the flow of current through the circuit. The net impeding force offered by a circuit to the flow of an alternating current is known as its impedance, and is determined by the magnitudes of the various constants. Heretofore it has been customary to measure impedance by passing an alternating current of a given frequency through the circuit and noting the corresponding values of impressed voltage and current, from which data the impedance may be calculated. Furthermore, in determining the value of any one of the constants of a circuit, it has been customary to hold the other constants at a known or fixed value and take simultaneous readings of current and impressed voltage, from which data the value of the unknown constant may be determined. Such methods, while usually productive of satisfactory results, require a great many measurements and calculations and consequent time and care in order to render the results reasonably free from error.

In order to accurately measure the constants of a circuit it is necessary or desirable that no current be flowing in it. It has therefore been found to be difficult or impossible to obtain satisfactory measurements in such circuits as cannot conveniently be cut out of service for a sufficient length of time to allow the measurements to be made, or in circuits which inherently contain a source of electromotive force.

It is the principal object of the present invention to provide an apparatus which may be quickly and conveniently applied to an electric circuit, and which will indicate directly the magnitude of its impedance.

It is a further object of the invention to provide an apparatus which, when applied to an electric circuit, will indicate the value of any one of the constants upon which the value of the impedance depends, provided the remaining constants of the circuit are negligibly small or are maintained at fixed values.

It is also an object to provide an apparatus which is capable of indicating the values of various other quantities, chiefly of an electrical nature, which are influenced by one or more of the factors which determine the impedance of the circuit.

It is a further object to provide an indicating meter of this type which will show directly the value of the impedance of a circuit containing a source of uni-directional potential or in which a uni-directional current is flowing, and which will also indicate with substantial accuracy the magnitude of the electrical resistance of batteries, electrolytic cells, and the like.

It is a still further object of the invention to provide an apparatus of the above type which contains a small number of elements capable of being easily mounted in a portable shell, and which may be manufactured at such cost as to be commercially practicable.

I have illustrated a preferred embodiment of my invention in the accompanying drawings in which Figures 1 and 2 are views, largely diagrammatic, illustrating my invention as employed in measuring the impedance of a typical alternating current circuit;

Figs. 3 and 4 are views similar to Figs. 1 and 2, respectively, illustrating a modified form of apparatus; and Fig. 5 is a view showing the connections employed for measurements in a circuit containing a source of direct current potential.

Referring to Fig. 1 of the drawings, 1 indicates an instrument adapted to directly record the resistance of an electrical conductor connected across its terminals, and 2 indicates a cooperating device electrically connected to the instrument 1 by means of leads 3 and 4 and adapted to convert unidirectional current into alternating current. A second pair of leads 5 and 6 serves to connect the converter 2 with the circuit whose impedance is to be measured, here shown as a typical alternating current circuit containing resistance R, inductance L, and capacity C.

The instrument 1, which is here employed to indicate the impedance of the alternating current circuit, may be any type of ohmmeter which directly indicates the ohmic value of the resistance under measurement. I preferably, however, employ an ohmmeter of the type disclosed in my Patent No. 1,426,619 consisting essentially of a pair of coils 7 and $7^a$ mounted in fixed relation upon a rotating axle which also carries the indicating pointer 8 of the instrument. The internal battery B is included in the common branch of a pair of circuits, one of which traverses the coil $7^a$ and the other of which includes the coil 7 and the binding posts 9 of the instrument across which the circuit to be measured is normally connected. With this construction both the fixed circuit and the circuit containing the unknown resistance are constantly subjected to the same voltage, since any fluctuation in the battery voltage is transmitted to one circuit as well as the other, and thus the indications of the instrument depend solely on the relative magnitudes of the currents flowing through the coils 7 and $7^a$, which coils are so wound as to exert opposing torques when traversed by current.

The leads 3 and 4 from the binding posts 9 of the ohmmeter are connected at diametrically opposite points to the converter 2, which consists essentially of a cylindrical commutator having two semi-circular electrically conducting segments 10 and 11 separated from each other by means of insulating strips 12 extending longitudinally of the commutator and inserted between the abutting faces of the segments. The leads 5 and 6, which communicate with the circuit to be measured, also contact with the commutator 2 at diametrically opposite points and are 90° distant from the respective points of connection of the leads 3 and 4. The contact with the surfaces of the commutator segments is preferably accomplished by means of small brushes of silver or other metal of high electrical conductivity which are of width substantially equal to the width of the insulating strips 12, so that at no time will the brushes short circuit the segments 10 and 11 but will nevertheless establish a contact with one segment at substantially the same time contact with the other segment is broken. The commutator 2 may be rotated at constant speed by any convenient means such as a synchronous motor, a clock spring mechanism, or the like.

A current will flow as indicated by the arrows in Fig. 1 whenever the battery B is connected in circuit by means of a suitable key, not shown, provided on the instrument 1. Assuming the binding posts 9 to be of positive and negative potential as indicated, current will traverse the lead 4 to the commutator segment 11, from whence it will flow out through lead 6 into the circuit being measured since the leads 4 and 6 are both in contact with segment 11. After traversing the length of the unknown circuit, the current will pass to the commutator bar 10 through lead 5 and will subsequently flow to the negative binding post 9 through lead 3 which, in common with lead 5, is in contact with segment 10. As the commutator is continuously rotated the relative position of the segments and brushes will constantly change. Their relation after rotation through 90° in a clockwise direction is indicated in Fig. 2, in which case current will traverse lead 4 and enter the commutator segment 11 as before. In this position, however, lead 5 is in contact with the segment 10, thus causing current to traverse the unknown circuit in the reverse direction and subsequently return to the instrument through lead 6, commutator segment 10, and lead 3. It is thus seen that a reversal of current through the unknown circuit will occur at every one-fourth revolution of the commutator 2. By reason of this fact, an alternating current of any desired frequency may be caused to flow through the unknown circuit by merely rotating the commutator at the proper speed.

Since the voltage impressed upon the fixed circuit contained within the instrument 1 is equal to that impressed upon the unknown circuit, the relative magnitude of the current which flows through the unknown circuit will depend upon the impedance of the circuit. At all times that portion of the unknown circuit containing the coil 7 through which direct current flows is connected in series with that portion of the circuit through which alternating current is flowing. It is evident, then, that the same quantity of electricity must flow through the alternating current portion of the circuit as through the direct current portion, so that the indication of the instrument as determined by the direct current flowing through coil 7 will be an accurate indication of the impedance of the unknown circuit. The instrument may readily be calibrated to read impedance directly in ohms.

The device for converting the direct current from the battery B into alternating current in the unknown circuit need not be a commutator as shown in Figs. 1 and 2, but may be any device which will accomplish the same purpose. In Figs. 3 and 4 I have illustrated a vibration type of converter having springs 13 and 14 connected, respectively, to the binding posts of the ohmmeter 1. Each of these springs is provided with a pair of contacts cooperating with the stationary contacts 15 and the contact 16 mounted on the free end of a resilient rod or support 17, contacts 15 and 16 being electrically connected in series with the unknown circuit. The resilient rod 17 is in the nature of a tuning fork and has a definite frequency of vibration. Vibration of the rod is produced by means of a magnet 18 whose winding is actuated by a battery or other direct current source 19, a contact 20 being provided between the end of the energizing winding and the rod 17. With the position of parts as shown in Fig. 3 the rod 17 has been freed from the magnet and is sprung up to make contact at 20 with the battery circuit. Upon closing the circuit in this manner the battery will send a current through the winding of the magnet 18 and the arm 17 will accordingly be attracted downwardly by the magnet, thus breaking the contact at 20. Immediately upon the breaking of the contact the magnet winding will become deenergized and will release the arm 17, allowing it to spring back into the position shown to again complete the magnet circuit. This sequence occurs very rapidly, and the speed of movement of the rod 17 will automatically adjust itself to the natural frequency of vibration of the rod. This type of vibrator affords a means of generating an aternating current of relatively high frequency, the frequency of which may readily be varied by loading the rod at some portion of its length, as at 17$^a$, to increase its period of vibration.

In Fig. 3 the rod 17 is in its uppermost position and its contact 16 rests against the outer contact 21 of the spring 13, at the same time displacing the spring a sufficient amount to break the connection between the stationary contact 15 and the inner contact 21$^a$. Current will thus flow out from the positive terminal of the instrument 1, through contacts 21 and 16, and into the rod 17, from whence it will traverse the unknown circuit and return to the instrument 1 through the contact 15 and the cooperating contact 22$^a$ on the spring 14. When the magnet 18 becomes energized and draws the arm 17 to its lowermost position, as shown in Fig. 4, the contact 16 will bear against contact 22$^a$, thus pressing spring 14 out of engagement with contact 15 and allowing spring 13 to make contact at 15. Current will then flow from the positive terminal of the instrument 1 through contacts 21$^a$ and 15 and will traverse the unknown circuit in the opposite direction, returning to the instrument through contacts 16 and 22. Every complete vibration of rod 17 thus causes a complete cycle of current through the unknown circuit, and the frequency of the current is equal to the frequency of vibration of the arm 17.

If a current of given frequency is passed through a circuit and two of the circuit constants held at a known value, the remaining constant may be measured. It is especially desirable to provide means for conveniently indicating the value of one of the circuit constants in this manner, since in the taking of test data all of the circuit constants except one are invariably maintained at fixed values while the other is changed periodically and readings taken at each of the settings. Furthermore, in many circuits of particular commercial importance only one of the circuit constants is of importance. For instance, a circuit may contain one or more coils for the purpose of giving it a high inductance, and its resistance and capacity may be so small as to be entirely negligible. In such a case the indication of the instrument 1, which normally represents the impedance of the circuit, is dependent only upon the inductance and accordingly is a measure of the value of the inductance directly. Likewise, a simple circuit may contain a cendenser but may have practically no resistance or inductance in which case the indication of the instrument would depend only upon the capacity and can accordingly be used to indicate directly the value of the capacity. This feature of my apparatus is of particular value for use in adjusting the capacity and inductance in telephone circuits. The instrument 1 may be calibrated to read directly the value of inductance, capacity or other quantity being measured, or the values of this quantity may be calculated from the indication of the instrument expressed in terms of impedance by merely applying a single multiplying factor.

In measuring the circuit constants the converter is driven at a constant speed and the resulting alternating current is passed through the circuit being tested. Inasmuch as the impedance depends also upon the frequency of the alternating circuit, if the circuit constants are all maintained at a fixed value the instrument 1 will indicate frequency. Accordingly, if the commutator 2 is geared or otherwise connected to a motor or other rotating apparatus the indication of the instrument 1 will be proportional to the speed of the motor. The instrument may thus conveniently be used as a tachometer to indicate variations in speed or to run tests in which the speed of the machine under test is varied.

A still further application of my invention is in the measurement of various other quantities which depend in some way upon the frequency of the current or upon the constants of the circuit. In certain determinations it is often desirable to ascertain the value of the inductive reactance or the capacity reactance of the circuit. Since these quantities are dependent upon the inductance and capacity, respectively, the instrument 1 may be used to indicate their values as well as the values of inductance and capacity, or if the instrument is not so calibrated, the desired values may be obtained by a simple multiplying factor applied to the readings of the instrument. Furthermore, such quantities as the natural frequency of an oscillating circuit or the wave length characteristic in the circuit, which quantities are dependent on both inductance and capacity, may be read directly from the instrument 1 if properly calibrated, or may be obtained by a simple proportionality factor. This is true because the resistance of oscillatory circuits is practically negligible and the indication of the instrument is then dependent only upon the inductance and capacity of the circuit; that is, upon the same quantities which determine the natural frequency and the wave length.

By a proper adjustment of the instrument, which is accomplished in the manner set forth in my copending Patent No. 1,426,619, a satisfactory scale range may be obtained for the measurement of any of the circuit constants, and by additionally choosing desirable values of the circuit constants a satisfactory range may be obtained for indicating rotative speeds. For example, if it is desired to measure the speed of a motor and to have a sensitive indication of variations in speed, the resistance and capacity may be made small and the inductance large, in which case the indication of the instrument will be dependent only upon the speed and the inductance. Now if the instrument 1 be adjusted so that its total scale range corresponds to a relatively small change in the ratio of currents flowing in its two coils, a relatively small change in the motor speed will produce a substantial deflection of the scale of the instrument.

In Fig. 5 I have illustrated my apparatus as applied to measurements conducted on a circuit which itself contains a source of uni-directional potential 23, here conventionally represented as a battery, but which may be due to any other cause such as the flow of a direct current through the circuit. Direct current from the battery B contained within the instrument 1 is converted by the commutator 2 into an alternating current which passes through the unknown circuit. Due to this current which flows through the instrument 1 a true indication of the impedance of the unknown circuit will be obtained in the same manner as described in connection with the system shown in Fig. 1. However, due to the direct current source 23, a direct current will flow in the unknown current and will be transmitted to the commutator 2 through leads 5 and 6. The effect of the commutator is to convert this direct current into alternating current, and it will appear as such in the leads 3 and 4 and in the coil 7 of the instrument 1. Inasmuch as the instrument 1 is designed to operate on direct current and has a uni-directional current flowing through its coil 7ª, the alternations of currents in the coil 7 will alternately tend to move the indicating needle in opposite directions, and as a result will produce no effect upon it whatever since the current alternations occur with such rapidity that the inertia of the moving parts will effectively prevent the instrument from responding. Furthermore, the inductance of coil 7 is high and only a very small alternating current will pass through it, and the torque exerted by such current will be correspondingly feeble.

The reading of the instrument is thus determined solely by the direct current which traverses its coil and consequently a true reading of the impedence of the unknown circuit is obtained regardless of whether the circuit itself contains a source of uni-directional electro-motive force. Since the internal resistance of storage batteries, electrolytic cells, and the like, is equal to their impedance, this feature of my apparatus affords a quick and convenient method for accurately determining the ohmic resistance and electrical conductivity of such current sources, as well as a means of conducting measurements on any direct current circuit without necessity of cutting it out of service.

While I have illustrated a preferred embodiment of my invention, it is to be understood that any type of converter adapted to convert direct current into alternating current of the same means effective value may be employed, or any type of ohmmeter may be used, it being essential for measurements in circuits containing a source of electromotive force, however, that the instrument be unaffected by alternating current. Further changes in the arrangement and details of construction may be made within the full scope of the appended claims.

I claim:

1. Apparatus for measuring the impedance of an inductive electrical circuit comprising a direct current ratio meter having a pair of coils, a source of direct current, elements providing a path of known resistance for passing current from said source through one of said coils, a commutating device having two sets of terminals, elements connecting said source and the second of said crossed coils across one set of said terminals, whereby the said source passes direct current to said second coil and alternating current to a circuit under measurement when the latter is connected across said second set of terminals.

2. Apparatus for measuring the impedance of an electrical circuit, comprising a resistance measuring instrument of the type including a pair of coils and a source of direct current, elements completing a path of known resistance between said source and one of said coils, and means for completing a current path through the said circuit under measurement and the second of said coils, said means including a device for converting direct current flowing through the said second instrument coil into alternating current when it traverses said circuit under measurement and converting direct current flowing in said circuit into alternating current when it traverses said instrument.

In testimony whereof I affix my signature.

CHARLES E. VAWTER.